United States Patent
Mitchell et al.

[11] Patent Number: 5,963,966
[45] Date of Patent: Oct. 5, 1999

[54] AUTOMATED CAPTURE OF TECHNICAL DOCUMENTS FOR ELECTRONIC REVIEW AND DISTRIBUTION

[75] Inventors: Brian T. Mitchell, Schwartz Creek; Margaret J. Whalen, Woodhaven, both of Mich.

[73] Assignee: Cybernet Systems Corporation, Ann Arbor, Mich.

[21] Appl. No.: 08/746,450

[22] Filed: Nov. 8, 1996

Related U.S. Application Data

[60] Provisional application No. 60/006,372, Nov. 8, 1995.

[51] Int. Cl.$^6$ .................................................. G06F 17/30
[52] U.S. Cl. .......................................................... 707/513
[58] Field of Search ........................... 707/500, 513, 707/515, 530, 501, 529, 200.34, 200.33

[56] References Cited

U.S. PATENT DOCUMENTS

| | | | |
|---|---|---|---|
| 5,528,740 | 6/1996 | Hill et al. | 395/128 |
| 5,608,874 | 3/1997 | Ogawa et al. | 395/200.15 |
| 5,708,826 | 1/1998 | Ikeda et al. | 395/762 |
| 5,721,827 | 2/1998 | Logan et al. | 395/200.47 |
| 5,740,425 | 4/1998 | Povilus | 395/611 |
| 5,745,360 | 4/1998 | Leone et al. | 364/140 |

*Primary Examiner*—Joseph H. Feild
*Assistant Examiner*—Alford W. Kindred
*Attorney, Agent, or Firm*—Gifford, Krass, Groh, Sprinkle, Anderson & Citkowski, PC

[57] ABSTRACT

Paper documents are automatically converted into a hypertext-based format so that they can be accessed through electronic networks, including the Internet, or via non-volatile transfer media such as disks or CD-ROMs. The invention generalizes the concept of form-based recognition while extending the concept of document retrieval to include document structure knowledge, thereby providing the advantages found in both form-based recognition (utilization of document structure knowledge) and image-based information retrieval (robustness). In a preferred embodiment, a method according to the invention enables direct translation of a paper document into a hypertext-based format so that it may be directly accessed through the Internet using current browsers such as Mosaic, Netscape and Microsoft's Explorer.

18 Claims, 12 Drawing Sheets

```
┌─────────────────────────────────────────────────────────────┐
│             NCSA Mosaic: Document View                       │
├─────────────────────────────────────────────────────────────┤
│  File    Options    Navigate    Annotate                     │
├─────────────────────────────────────────────────────────────┤
```

Title: Cybernet IETM Proposal

URL: http://www.cybernet.com/~ganz/ietm_index.html

Automated Capture of Technical Manuals Into IETM Format for Electronic Review and Distribution

<u>SEARCH TEXT</u>

TABLE OF CONTENTS

- <u>Proposal Cover Sheet</u>
- <u>Proposal Summary</u>
- Part 1. <u>Identification and Significance of the Problem</u>
- Part 2. <u>Phase I Technical Objectives</u>
- Part 3. <u>Phase I Work Plan</u>
- Part 4. <u>Related Work</u>
    - ☐ 4.1. <u>Producing a Quality Binary Image</u>
    - ☐ 4.2. <u>Character Recognition</u>
    - ☐ 4.3. <u>Mathematical Morphology</u>
    - ☐ 4.4. <u>USPS - ZIP Codes</u>
- Part 5. <u>Relationship with Future R&D</u>
- Part 6. <u>Commercial Applications Potential</u>
- Part 7. <u>Company Information</u>
- Part 8. <u>Key Personnel and Other Staff</u>
- Part 9. <u>Subcontract and Consultants</u>

| Back | Forward | Home | Reload | Open.. | Save As.. | Clone | NewWindow | CloseWindow |

Figure 4

```
<HEAD>
<TITLE>
Part 3. Phase I Work Plan
</TITLE>
</HEAD>
<BODY>
Page 6 of 25
<p>
[<A HREF="../ietm_index.html">Index</A>]
[<A HREF="page6_op.html">Up</A>]
[<A HREF="page5_op.html">Previous</A>]
[<A HREF="page7_op.html">Next</A>]
<p>
<A HREF="/cgi-bin/imagemap/~ganz/imgmaps/p6.map">
    <IMG src="/~ganz/pages/page6_rev.gif"  WIDTH=600
    HEIGHT=777 ISMAP> </A> <p>
Page 6 of 25
<p>
[<A HREF="../ietm_index.html">Index</A>]
[<A HREF="page6_op.html">Up</A>]
[<A HREF="page5_op.html">Previous</A>]
[<A HREF="page7_op.html">Next</A>]
</BODY>
```

Figure 6

NCSA Mosaic: Document View

File   Options   Navigate   Annotate

Title: Part 3. Phase I Work Plan

URL: http://www.cybernet.com/~ganz/pages/page6_op.html

Page 6 of 25

[Index] [Up] [Previous] [Next]

Part 3. Phase I Work Plan

The TM-to-IETM conversion task can be decomposed into several subproblems which include the following: Text Recognition (or OCR); Recognition of References and the creation of the appropriate pointers; the Conversion of Graphical Figures into electronic format; Understanding Table formats; Identification and Conversion of Procedural Data; and the Understanding of Warnings, Cautions, and Notes found within a TM. It is our intent to evaluate the potential for automating each of these components of the translation process.

Because text recognition plays a central part of the entire TM translation process (text, table cells, reference pointers, procedural data steps, and the body of warnings, cautions, and notes) its performance is especially important for ETM conversion. Textual word translation can be improved by using known word lexicons to transform the recognition from character level to word level. It is important to note however that this technique cannot be used to improve number recognition, since all possible combinations of numbers are legal, and thus other contextual information must be used (e.g. known number sequences, table lists, etc.) As the developers of an acknowledged high performance numeric character recognizer2 (USPS ZIP Codes) we have developed techniques that can be used to increase numeric recognition performance, and intend to apply those techniques to this portion of the problem.

References can occur throughout the TM to provide pointers to the following: models or types, government specifications and standards, temperature readings, instrument readings, switch positions and panel markings, U.S. standard unit measurements, figure numbers, figure numbers followed by an index number, parts on diagrams, tables, other paragraphs in the same manual, other subordinate paragraphs, other TM identification numbers, footnotes, series of items, or data applicable to a sentence or paragraph. The references contained within a TM are generally textual by nature, and as such fall within the text recognition problem. In general, however, reference recognition is more difficult than simple text recognition because it often lacks any contextual information. There is a great deal of redundancy contained

| Back | Forward | Home | Reload | Open.. | Save As.. | Clone | NewWindow | CloseWindow |

Figure 7

```
Imagemap for page 6 default /cgi-bin/nph-no_op.sh
rect http://www.cybernet.com/~ganz/pages/page18_op.html  89, 258, 199, 269
```

Figure 8

| Form 9.A  Proposal Cover Sheet | |
|---|---|
| 1. Topic 2: Interactive Document and Data Review | 1994 STTR |
| 2. Project Title: Automated Capture of Technical Manuals into IETM Format for Electronic Review and Distribution | |
| 3. <u>Small Business Concern:</u> | <u>Research Institution:</u> |
| Cybernet System Corporation<br>Suite B-101<br>1919 Green Rd.<br>Ann Arbor, MI 48105<br>313-668-2567 | The University of Michigan<br>College of Engineering<br>Office of Technology Transfer<br>2901 Hubbard<br>Ann Arbor, MI 48109-2106 |

Figure 9

```
#!/bin/sh
echo Content-TYPE: text/html
echo if [ $# = 0 ]        # is the njumber of arguments == 0?
   then              # do this part if there are NO arguments
echo "<HEAD>"
echo "<TITLE>Cybernet Proposal Search</TITLE>"
echo "<ISINDEX>"
echo "</HEAD>"
echo "<BODY>"
echo "<H1>Cybernet Proposal Search</H1>"
echo "Enter your search in the search field.<P>"
echo "This is a case insensitive substring search:  thus"
echo "searching for 'cat' will find 'Cat' and 'CATEGORY'."
echo "</BODY>"
   else             # this part if there ARE arguments
echo "<HEAD>"
echo "<TITLE>Result of search for \"$*\".</TITLE>"
echo "</HEAD>"
echo "<BODY>"
echo "<H1>Result of search for \"$*\".</H1>"
#echo "<PRE>"
    for i in $*
      do
        grep -i $i /extern1/people/ganz/public_html/pages_txt/page*_op.txt | /usr/local/etc/httpd/cgi-bin/format_grep
      done
#echo "</PRE>"
echo "</BODY>"
fi
```

Figure 10

Result of search for "vector".

page 13
    output vector that exists in within the recognizer before some decision technique page 16
    vector is constructed which contains the area in the image of each possible "characteristic
    segments from the thinned text. They encode this information into fixed length vectors and

Figure 11

Table of Contents
Part 1. Identification

Figure 12

Table of Contents
Part 1. Identification

Figure 13

Table of Contents
Part 1. Identification

Figure 14

AUTOMATED CAPTURE OF TECHNICAL DOCUMENTS FOR ELECTRONIC REVIEW AND DISTRIBUTION

REFERENCE TO RELATED APPLICATION

This application claims priority of U.S. provisional application Ser. No. 60/006,372, filed Nov. 8, 1995, the entire contents of which are incorporated herein by reference.

FIELD OF THE INVENTION

The present invention relates generally to document processing, and, in particular, to automated document conversion to digital form for broadcast over networks, including the World Wide Web, and/or transfer media such as disks or CD-ROM.

BACKGROUND OF THE INVENTION

Two major components of document conversion are page decomposition and text recognition (OCR). Page decomposition identifies the overall layout of a document page, whereas OCR identifies the ASCII components found within the page components.

A page decomposition or segmentation module accepts an input document page, and processes it into its constituent parts, including text, tables, references, procedural data, and graphics. Because page decomposition occurs first in the processing chain, it is one of the most important modules of any automatic document understanding system. It is very difficult to recover from any errors that occur at this stage of processing, and as such it is important that a very reliable page decomposition module be developed.

Most page segmentation methods can be classified into three broad categories: bottom-up, top-down and hybrid. The bottom-up strategies usually begin with the connected components of the image and merge them into larger and larger regions. The components are merged into words, words into lines, lines into columns, etc., until the entire page is completely assembled. In the top-down approaches, the page is first split into blocks, and these blocks are identified and subdivided appropriately, often using projection profiles. The hybrid methods combine aspects of both the top-down and bottom-up approaches. The page can be roughly segmented by a sequence of horizontal and vertical projections and then connectivity analysis is used to complete the segmentation.

Existing document conversion techniques include: 1) OCR (optical character recognition) document conversion, 2) form-based OCR, and 3) combined image and OCR systems. The first technique understands and translates the document into its individual components. The second utilizes spatial and content constraints of document forms to increase OCR reliability. The third leaves the document in its image form, but also utilizes OCRed text to provide indexing into the image database.

An OCR document conversion system which translates document images into ASCII and graphics components is illustrated in FIG. 1. The approach begins with page decomposition, wherein each page is segmented into graphic and text regions. Algorithms to process these regions are incorporated into the system. Graphical operations include extracting text from within graphics and raster-to-vector conversion. OCR is computed for the text regions, as well as any text located within the graphical regions. An integration step combines the results of the graphical and textual processes into a final electronic format.

The ASCII and graphics format obtained in this system is the only record of the document which is stored, as no images of the original document are kept. Since any errors introduced during page decomposition are propagated forward in the system, it is important that the graphical and textual regions of the page be correctly identified. Thus, the automatic regions generated must be manually checked or the page must be manually separated into regions. It is also important that the text be correctly recognized to ensure that the document is correctly captured. This requires that the OCR results be manually scanned and any errors corrected. Similarly, the text within graphics must be correctly extracted and recognized, again requiring manual checking. This manual checking can involve large cost which is often prohibitive for many applications.

Form-based OCR systems use the spatial and content constraints found in document forms to increase OCR conversion performance. According to this approach, a "form" may be defined as a document containing data written in fields that are spatially stable on the document. All form processing systems require the creation of a template showing the system what a particular form looks like and where to find the fields to read.

Form identification decides which master form was used in a given image, and passes that information to the form removal functions. Form removal strips all standard data from the scanned forms, including lines, instructions and examples, leaving only the information entered into the form by the applicant. The space necessary to store images is reduced by allowing users to save stripped forms and later add back the master form data before displaying or printing.

Full function form processors, in addition to machine print, also read hand printed characters and optical marks such as checkboxes. Form processing systems offer a broad array of tools, some standardized and some custom, which exploit information specific to a particular form type for error detection or correction. Restrictions can be applied to fields to increase recognition accuracy. For example, the field masking tool permits individual characters within a field to be recognized exclusively as either an alpha character or a numeric character. Thus, a social security number field can be required to contain only nine numeric characters and possibly two dashes. Segmentation of the field is then limited to 9 or 11 characters and recognition is limited to 10 digits and 1 dash. Additional tools include external table lookups, where field contents can be compared to a table of possible responses and the best match selected; checks of digit computations, where errors are detected by performing a mathematical operation on a field's contents and comparing the result to a predetermined total contained in the same field; and range limits, where the number in the field is checked to determine if it is within a valid range.

Unlike generic OCR systems, which only allow the error tolerance level to be set globally, form processing systems permit error tolerance levels (confidence levels) to be set on a field level. Thus, important fields, where field importance differs based on the form, can have their confidence levels set to a threshold requiring higher OCR accuracy.

Combined OCR and image systems utilize both data sources to provide robust retrieval, as illustrated in FIG. 2. The approach does not convert the document page directly to ASCII and graphics format, but rather saves a bit-mapped image of the document page and devises indexing schemes to retrieve specific pages. When a page is retrieved operations can then be performed on the areas of interest. For example, OCR can be computed on selected areas, or graphics can be extracted.

Once the text regions of a document have been identified, the characters within the regions need to be recognized. There are many different approaches to character recognition, but they can be generally grouped into two main categories: template-based methods and feature-based methods. Template methods maintain a collection of sample letters and identify a component in question by finding the closest-matching template. Feature methods, on the other hand, try to break the component into a collection of "features" by identifying where strokes join or curve significantly.

The classic template solutions compare each component to a collection of models representing all possible letters in all possible fonts. Thus, templates must be created for each of the different fonts. Contrarily, feature based recognition algorithms need not be tuned to individual typefaces, because they are based on finding characteristic features of each letter. For example, regardless of the typeface, a lowercase "t" consists of a strong vertical stroke crossed with a horizontal stroke. Thus, the feature based methods attempt to find this essence of the letter.

Each of the OCR techniques has its benefits and shortcomings. Combining the various methods in a voting scheme can overcome the limitations of each of the individual methods. In a voting scheme, the results of each of the OCR modules are passed to a decision module to determine a final recognition result. Since the decision module has knowledge about each of the OCR modules, it can determine the best possible answer.

The decision module can keep track of the character results and which OCR methods presented the correct response to the decision module. For example, if three methods report that the input character is a "B" and one method decides the character is an "8", the decision module will likely choose "B" as the best result. Further, the module that made the mistake will be noted for the next time. This adaptive learning approach allows the system to learn from its mistakes.

It is important to note that voting systems perform best when the hypotheses from the OCR systems are of high accuracy. When a text region is degraded and difficult to read, there is usually much disagreement among the recognizers, which is difficult for a voting system to resolve.

Each year, the Information Science Research Institute (ISRI) at the University of Nevada, Las Vegas (UNLV) conducts a test of the performance of various OCR systems, many of which are commercially available. Although recently tested OCR systems do not quite reach 100%, current recognition rates are impressive and improvement is ongoing. Achieving the last few percent is always the most difficult part, but OCR developers are steadily increasing their performance. With the incorporation of a voting scheme, the recognition rates increase even more.

If the OCR generated text is to be used in a text retrieval application, the percentage of words correctly recognized by the OCR system is of considerable interest. In a text retrieval system, the documents are retrieved from a database by matching search terms with words in the document. Thus, the word accuracy of the OCR-generated text is very important. Common words, such as "and," "of," "the," etc., usually provided no retrieval value in an indexing system. These words are termed stop words, and all other words are termed non-stop words. It is the recognition rate of these non-stop words that is of greatest importance to text retrieval applications.

If OCR is to be used as a conversion process to input technical manuals into ASCII form, manual checking and correcting of the OCR of the text will be necessary. Assuming an OCR character accuracy rate of 99%, a page with 4000 characters would result in 40 character errors per page. The issue becomes the cost of this manual correction versus the effectiveness of OCR, i.e. is it cheaper to correct the OCRed version or simply retype it?

To answer this question, we conducted a test using the OmniPage Professional OCR product to determine the time needed to correct an OCRed document versus the time needed to retype the document. It was assumed that the documents can be scanned and OCRed in a batch mode with the results saved to a file for future manual correction. Thus, only the actual labor costs are measured, not any time spent scanning and recognizing the document.

Seven pages from various documents were scanned and OCRed. The pages chosen for this test were quite simple, but included different fonts, and bold and italic characters. They contained single columns of text, no graphics and very few underlined sentences, since underlines tended to present a problem to the OmniPage recognizer. A bibliography page was also included in the set to introduce digits (from dates and page numbers) and proper nouns (author's names) which cannot be automatically corrected by dictionary lookups.

OmniPage offers a method to check its OCR results. Any characters that the system has a difficult time recognizing are highlighted and the original image of the word in the context of the original page is presented to the user for possible correction. This method does not flag all OCR errors and presents numerous correct characters for viewing. Thus, this process was not incorporated in our timing test. The person correcting the text did not use this feature of the OmniPage system, but was allowed to use Microsoft Word spell checker to flag possible misspellings for correction.

Each OCRed page was manually corrected, and the correction time recorded. It took approximately 56 minutes to correct the seven pages. Assuming a typist can type 50 wpm, the time to retype these pages is 74 minutes or about 62 minutes at 60 wpm. From these numbers, it appears that OCRing the documents may be slightly more beneficial. However, a closer review of the manual corrections is needed.

The typical OCR errors include character omissions, additions and substitutions, bold and italic typeface errors, and incorrect spacing. Most of the missed errors were words recognized as bold typeface which were not bold in the original documents. The bibliography page (page five in the tables above) proved to be quite a challenge for the OCR system with fifty detected errors. The page was included because of its intermingling of digits and characters, and its inclusion of proper names and acronyms. This type of text must be carefully reviewed for errors. It is not like regular paragraphs where the corrector can simply read the flow of the sentences to check it. Dates, page numbers, and author's names must be carefully checked. Indeed, although the time required for retyping and manually correcting the pages in our test set were similar, the manual correction stage still left many errors uncorrected. Depending on the accuracy required, each page may need to be corrected by more than one person, thus doubling the time of manual correction.

The results of this experiment confirmed that OCR technology cannot be used to convert documents (either automatically or semi-automatically) in a cost-effective manner. More cost-effective methods are desperately needed, however, to convert existing large-scale, paper-document data bases into electronic form. Within the U.S. Government community, for example, reauthoring technical manuals into hypertext format costs between $200 and $1500 per page.

The use of hypertext documents has proven as a costeffective tool for supporting military equipment maintenance through the Department of Defense (DoD) Computer-aided Acquisition and Logistic Support (CALS) program. In this program, a hypertext format (IETM) was used for storing textual, graphical, audio, or video data in a revisable database. The IETM form enables the electronic data user to locate information easily, and to present it faster, more comprehensibly, more specifically matched to the configuration, and in a form that requires much less storage than paper. Power troubleshooting procedures not possible with paper Technical Manuals are possible using the computational capability of the IETM Display Device.

At the center of the IETM concept is the Interactive Electronic Technical Manual DataBase (IETMDB). This data structure is constructed from composite nodes which form the basic units of information within the IETMDB. These nodes are comprised of primitives, relationships to other pieces of information, and context attributes. The primitives include text, tables, graphics, and dialogs. The IETMDB is "format-free" in that it does not contain presentation information. As such, it does not impose structural requirements on the actual Data Base Management System (DBMS) methodology in use.

In summary, a hypertext-based approach to document conversion has potential for large-scale projects. However, in order to serve a greater technical and digital library community, existing hypertext approaches will need to be extended, to include more general encoding, revising, and distribution capabilities applicable to electronic technical data and documents.

SUMMARY OF THE INVENTION

Broadly, the present invention provides a method for converting paper documents into a hypertext-based format so that they can be accessed through networks such as the Internet or on media such as disk or CD-ROM. The method eliminates many of the errors normally associated with existing document conversion in a very cost effective manner, thus providing a low-cost, high-performance solution for converting existing paper-based databases into a form that can be accessed through the information highway.

More particularly, the method generalizes the concept of form-based recognition while extending the concept of document retrieval to include document structure knowledge, thereby providing the advantages found in both form-based recognition (utilization of document structure knowledge) and image-based information retrieval (robustness).

In one embodiment, the process utilizes the SGML format as a primary translation target to leverage ongoing work in developing this data format standard and tools. SGML is also the required markup language for the CALS text files as established by DoD standard MIL-M-28001, and thus, this design can be used to convert technical documents to this military standard. The invention also enables direct translation into HTML format (a subset of SGML), and thus provides a mechanism for translating documents into a format that can be accessed through the Internet using current browsers like Mosaic or Netscape. Accordingly, the method can be used to create electronic documents for a rapidly increasing Internet user population, which is currently estimated to be growing at a rate of over 70,000 new users each month.

BRIEF DESCRIPTION OF THE DRAWINGS

FIG. 4 is a screen display of an HTML, image-based document;

FIG. 6 is a HTML page for the system of FIG. 5;

FIG. 7 is a screen display of Mosaic page generated according to the invention;

FIG. 8 is a file map for the pages generated according to FIGS. 6 and 7;

FIG. 9 is a section of text which shows words associated with hyperlinks stored as reverse video;

FIG. 10 is a shell program to perform search and display results;

FIG. 11 show results of search for the word "vector";

FIG. 12 is a scan of text at 300 dpi;

FIG. 13 is a scan of text at 72 dpi;

FIG. 14 is a screen capture of a 72 dpi image; and

DETAILED DESCRIPTION OF THE PREFERRED EMBODIMENTS

Figure 1:
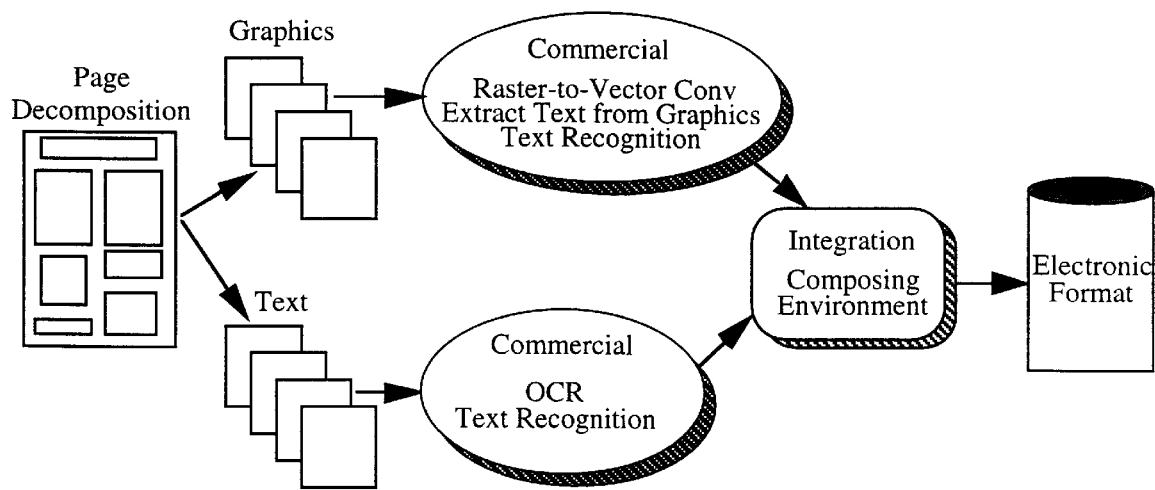
FIG. 1 is a diagram which represents a classic OCR approach to document conversion.
Figure 2:
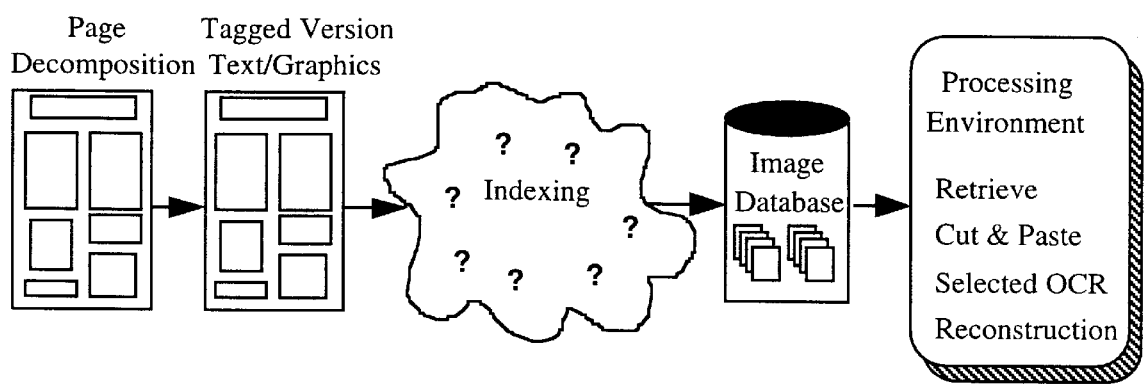
FIG. 2 is a diagram which represents a combined image and OCRed text approach to document conversion.
Figure 3:
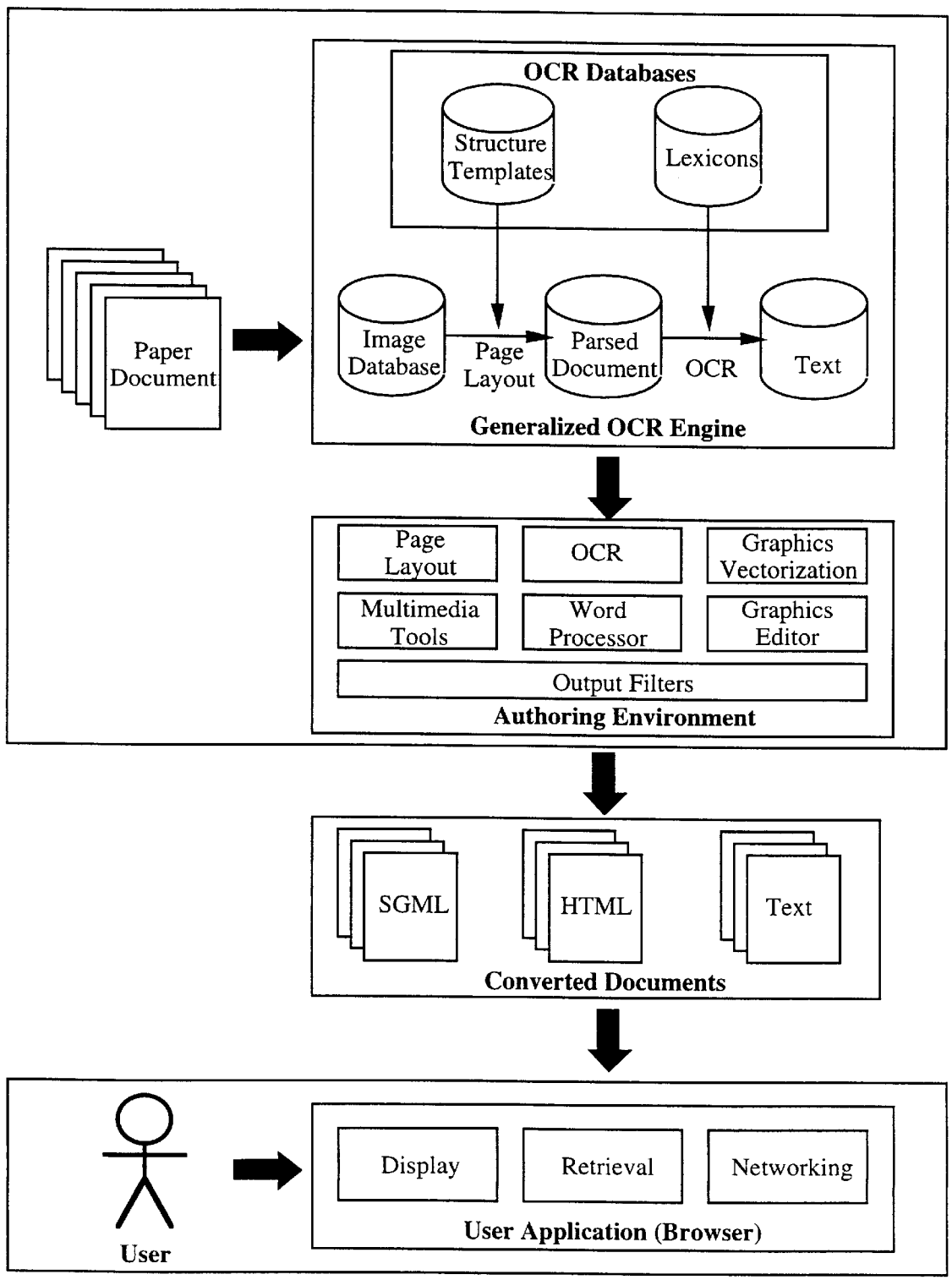
FIG. 3 is an overview of a system design according to the invention.

The present invention resides in a generalized OCR engine which extends techniques found in form-based OCR and combined-image-text OCR technologies. An overview of the method corresponding applications is illustrated in FIG. 3, and includes two primary components: 1)translation from paper to electronic form (SGML, HTML, text), and 2) a user application for reading these electronic documents. As also seen in the figure, the translation component is built from a generalized OCR engine and an authoring environment.

The generalized OCR engine according to this invention combines desirable features found in the form-based recognition systems and image-retrieval systems to produce a solution that is both cost-effective (in its solution) and elegant (in its generality) by generalizing the concept of form-based recognition to include both logical (document structure) with physical (spatial location).

The authoring environment provides a mechanism not only for controlling the document conversion process overall, but for adding to documents, once converted. As it is inevitable that the converted documents will need to be modified or extended, the complete document conversion process may be embedded within a multimedia editor which combines imaging, word processing, and multimedia tools in support of document extension. Conversion is only the first step. Active use of the resulting electronic documents is essential for sustaining value for many of the targeted databases. This approach is essential for maximizing the overall value of the document conversion system.

The user application (browser) component allows the user to access the resultant document using several different potential user applications, depending on the form of the electronic document. One example is an Internet Browser. By translating the document into HTML format (or an extended version of HTML), Internet users may easily access the translated documents regardless of geography. This is a powerful idea, in that it eliminates existing boundaries which limit the use of the knowledge contained within many existing paper-based databases.

Prototype HTML document Format Description

To demonstrate the potential of creating Internet documents, a prototype HTML document based on both images and OCRed text was implemented. A representative document, scanned from its paper form into an HTML document, is viewable at the following World Wide Web address: http://www.cybernet.com/~ganz/ietm_index.html using an HTML browser such as Mosaic, MS Explorer or Netscape. A simple search routine has also been implemented, which allows the document to be searched using the dirty OCRed text. A screen shot of this prototype document is illustrated in FIG. 4. Note that the Table Of Contents found within this figure contains items that are hyperlinked (using document structure knowledge) to various document images that can be brought into the viewer. Also note that the slider bar can be used to move sequentially through the document in a manner similar to reading a paper document from start to finish.

Figure 5:
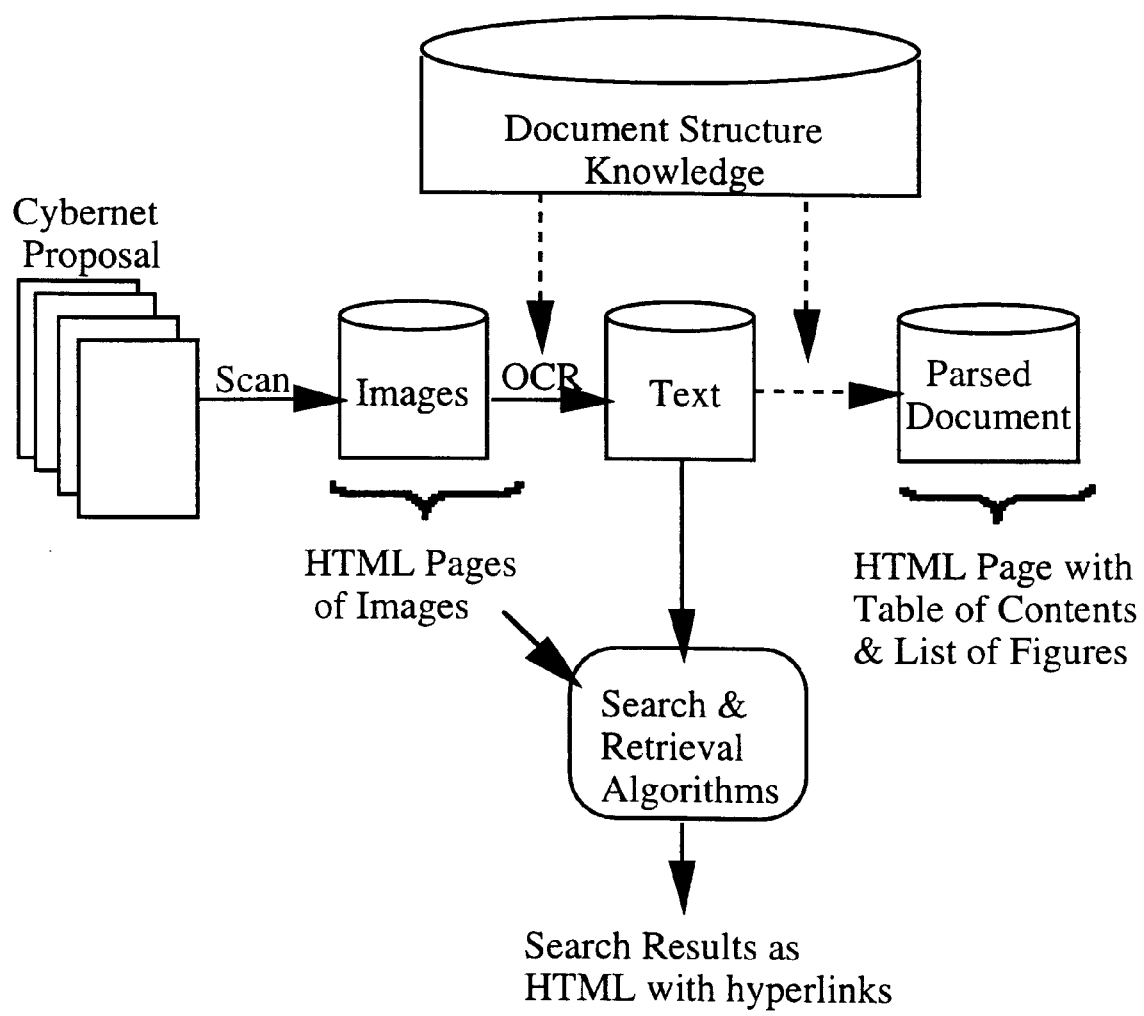
FIG. 5 is a diagram illustrating an HTML generator according to the invention.

In developing this prototype, a demonstration document conversion method was also developed wherein the pages of the paper document were scanned and OCRed. Any errors in the automatic zone detection were corrected, thus all text and graphics were correctly separated and labeled. However, no effort was made to correct the resulting OCR, thus the text database was uncorrected or "dirty". FIG. 5 provides an overview of the process used in developing this prototype.

As illustrated in the figure by dashed lines, the parsing of the sample paper document into a table of contents and list of figures was done manually, although this could also be automated. An HTML page was created with hyperlinks to connect each item in the Table of Contents and List of Figures with its corresponding HTML document page. A document understanding algorithm using document structure knowledge is preferably used to parse the text and create the Table of Contents, List of Figures and appropriate hyperlinks.

Method for HTML Coding of Pages

The method described encodes the document by forming an HTML (or SGML) page for each page in the source paper document. Each HTML page (typically a separate file, but multiple pages can be accommodated in a single file) contains an image of a document page and hyperlinks to four other pages, including the index page containing the Table of Contents, the section page containing the beginning of the section, the previous page of the document, and the next page of the document (links to other pages or HTML documents can also be inserted as needed for special formats). FIG. 6 shows the resulting HTML page.

The display generated by the HTML page on a Mosaic browser is illustrated in FIG. 7. As seen in the figure, the words between <TITLE> and </TITLE> in the HTML page appear in the title section of the Mosaic browser. The <BODY> section of the HTML page creates the four buttons [Index] [Up] [Previous] and [Next] seen in the Mosaic display. It also establishes the hyperlinks between the buttons and the specific proposal page to be viewed when a button is selected. For convenience, these buttons appear at both the top and bottom of the displayed page.

The <BODY> section of the HTML page also identifies the page image to be displayed when this HTML page is accessed. The <IMG> tag provides the location of the image, as well as its height and width. The browser uses the height and width information to place a properly-sized bounding box upon encountering the IMG tag and continues laying out the document text, with no performance delay to go discover the width and height of the image over the network.

Also included in the <IMG> tag is the ISMAP specification. This attribute indicates that the image is active and clicking inside the image may cause hyperlinks to be accessed. The ISMAP tag requires that a map file for the image be included. When a user clicks on the image, the coordinates of the click are passed to a gateway program image map and the appropriate map file is accessed to determine the hyperlink. FIG. 8 shows the map file for page 6 of the prototype document. Clicking on the appropriate page image within the rectangle (89, 258, 199, 269), which corresponds to the reverse video area containing the words "(U.S.P.S. Zip Codes)," accesses page 18 of the prototype. Clicking anywhere else within the image accesses the no operation shell, no_op.sh, and no change will be made.

The images of each of the 25 pages in the prototype document are stored in the Graphics Interchange Format (GIF) format. Although some browsers support multiple image formats, there are three formats that are always viewable, GIF images, X-Bitmaps and X-Pixelmaps. Both the X-Bitmap and X-Pixelmap formats store the image data as ASCII text formatted as Standard C character string arrays, and, as such, are an inefficient way of storing large images. Thus, GIF is currently the most common image format in World Wide Web applications.

The GIF format can store black-and-white, grayscale or color images, with a limit of 256 colors per image. The image data in GIF format is always compressed using the Lempel-Ziv-Welch (LZW) compression scheme. Thus, the images are stored in compressed format, and algorithms read the compressed GIF files without an intermediate step of having to uncompress the entire image.

Method for Creating Image Pages

To create the binary images of document pages, each page is scanned. In this example data scanning was done at 300 dots-per-inch, although higher or lower resolutions are possible. Since the sample document pages contain large white borders that do not contribute any information, the images were cropped to remove the borders and then rescaled to 8.0×10.35 at 300 dpi resolution. The resulting sample images are approximately 910 KBytes in size, which would be much too large to send across a telephone network in a timely manner (it would be acceptable over T1 networks or better and as stored data on a CDROM).

Since most monitors can only display 72 dpi, it is best if only 72 dpi images are sent across the network. Otherwise, data that cannot be displayed is being wastefully sent across the network. A downsampling routine was needed to rescale the images from 300 dpi down to 72 dpi in a manner that preserves the strokes of the characters in the image. The JBIG compression method, described in detail in a subsequent section, with its progressive coding and sophisticated resolution reduction algorithm was used to optimally downsample the images to 72 dpi. Finally, these 72 dpi JBIG images were converted to GIF format for a final file size of about 20 KBytes.

Hyperlinks

To establish hyperlinks within the document images, the HTML attribute ISMAP is used. This features allows images to be made fully active. When the user clicks inside the image, the coordinates of the click are sent to an image map program. An image map database file corresponding to the image relates the region selected to a specific hyperlink. The hyperlink is then accessed.

Since the text images are stored in binary format, words or phrases which have hyperlinks are converted to reverse video, as shown in FIG. 9, to make them distinguishable to the user. If the user clicks anywhere within the reverse video area, the hyperlink will be activated. Clicks outside the reverse video areas will cause no action.

Method for Text Searching within Documents

A search strategy may be implemented in the method as follows. When a search string is entered, the uncorrected OCR of the document pages is searched. The entire line of text containing the matching string is retrieved. Next, an HTML page is formatted to contain the page on which the string matched, as well as the full text line containing the string. Additionally, hyperlinks are established that allow the user to click on the page number and have the document page retrieved. FIG. 10 shows the shell program that is used to perform the search and display the results.

In the sample implementation, each document page was scanned and OCRed using the OmniPage professional software package. No attempt was made to correct the OCR and just the text recognition for each page was retained. No graphics were saved. These text files served as the database for the search and retrieval algorithms.

The UNIX "grep" command was used to implement the search routine for the demonstration. "Grep" searches files for a pattern and prints all lines that contain that pattern. The results of the "grep" were sent to a formatting program which creates a hypertext page with the results. FIG. 11 shows the results of a search for the string "vector" in the prototype document. Clicking on either the highlighted "page 13" or "page 16" causes the respective pages to be retrieved for viewing.

Data Compression and Display

The tradeoff between display quality and document image size is a major design consideration for image-based HTML documents. Documents stored as 8-bit grayscale images provide adequate image quality when displayed on a standard computer screen, but take too long to transmit across Internet connections. Documents stored as compressed 1-bit images can be easily transmitted across the Internet, but lack sufficient display quality.

The remainder of this section describes the issues associated with this tradeoff, and proposes a quality solution to this problem.

Issues

In operation, it was observed that the GIF images found in the conventional HTML standard were not ideally suited for document images. Document images compressed under this format were difficult to read unless stored as large gray-scale images, and transmitting such images across the network is very time consuming.

There are three factors involved in determining document image size: dots per inch (dpi), bits per pixel (bpp), and compression technique. The challenge is to tradeoff these factors to obtain minimal storage and sufficient quality.

Added to this problem is the factor that many computer monitors are low resolution, and thus require low dpi display of document images. If document images are stored at 300 dpi and are displayed on a 72 dpi monitor, much of the document data is discarded when the 300 dpi image is mapped to the 72 dpi display. FIG. 12 shows a portion of a 300 dpi, 1 bpp image. The character seen in this figure are crisp and legible.

When the image is downsampled to 72 dpi, much of the image quality is lost, as illustrated in FIG. 13. As seen in this figure, this downsampling can produce such effects as broken characters, touching characters, eliminated character features, and merged characters. In some cases, this process can create ambiguous character representations.

When such downsampled images are displayed on a computer screen the human eye tends to overlook many of these deficiencies. However, not all of these problems are overlooked, and the resulting display appears to be less than optimal as illustrated in FIG. 14. The appearance of such low resolution images can be somewhat improved by storing more than 1 bpp, since shades of gray can be used to ease the jagged character features. However, this comes at a high data storage and transmission cost.

The third factor, data compression, plays an equally important role in this problem. Lossless compression techniques assure that no important data will be lost, but do not significantly reduce the amount of data required to store document images. Lossy compression techniques are more aggressive in reducing the amount of storage required, but can eliminate important data.

JBIG Standard

One compression standard deals with many of the aspects associated with this issue. The International Organization for Standardization/International Electro-technical Commission (ISO/IEC), in collaboration with the International Telegraph and Telephone Consultative Committee (CCITT), defined an image compression standard for lossless image coding of bi-level images (ISO/IEC 11544:1993). The JBIG (Joint Bi-level Image Experts Group) standard defines a method of compressing two-tone or black/white images in a bit-preserving manner, wherein decoded images are digitally identical to the originally encoded image.

The JBIG standard can be parameterized for progressive coding. Thus, it is possible to transmit a low resolution image first, followed by resolution enhancement data. When decoding an image that has been progressively encoded, a low-resolution rendition of the original is made available first with subsequent doublings of resolution as more data is decoded. The progressive encoding mode utilizes a very sophisticated resolution reduction algorithm, PRES (progressive reduction standard), which offers the highest quality low resolution versions.

The progressive coding feature of JBIG is advantageous when an image is used by output devices with widely differing resolution capabilities. For example, when an image is displayed on a low resolution monitor (72 dpi), only that information in the compressed image required for reconstruction to the resolution of the display is transmitted and decoded. Then, if a higher resolution is needed for, say, printing to a 300 dpi printer, additional compressed data is transmitted and built upon the already transmitted data to obtain the higher resolution image for the printer.

Progressive coding is a way to send an image gradually to a receiver instead of all at once. During sending, more and more detail is sent and the receiver can build the image from low to high detail. JBIG uses discrete steps of detail by successively doubling the resolution. The sender computes a number of resolution layers for the image, d, and transmits these starting at the lowest resolution, d1. Resolution reduction uses pixels in the high resolution layer and some already computed low resolution pixels as an index into a lookup table. The contents of this table can be specified by the user.

Compatibility between progressive and sequential coding is achieved by dividing an image into stripes. Each stripe is a horizontal bar with a user definable height. Each stripe is separately coded and transmitted, and the user can define in which order stripes, resolutions and bit planes (if more than one) are intermixed in the coded data. A progressive coded image can be decoded sequentially by decoding each stripe, beginning with the one at the top of the image, to its full resolution, and then proceeding to the next stripe. Progressive decoding can be done by decoding only a specific resolution layer.

Figure 15:
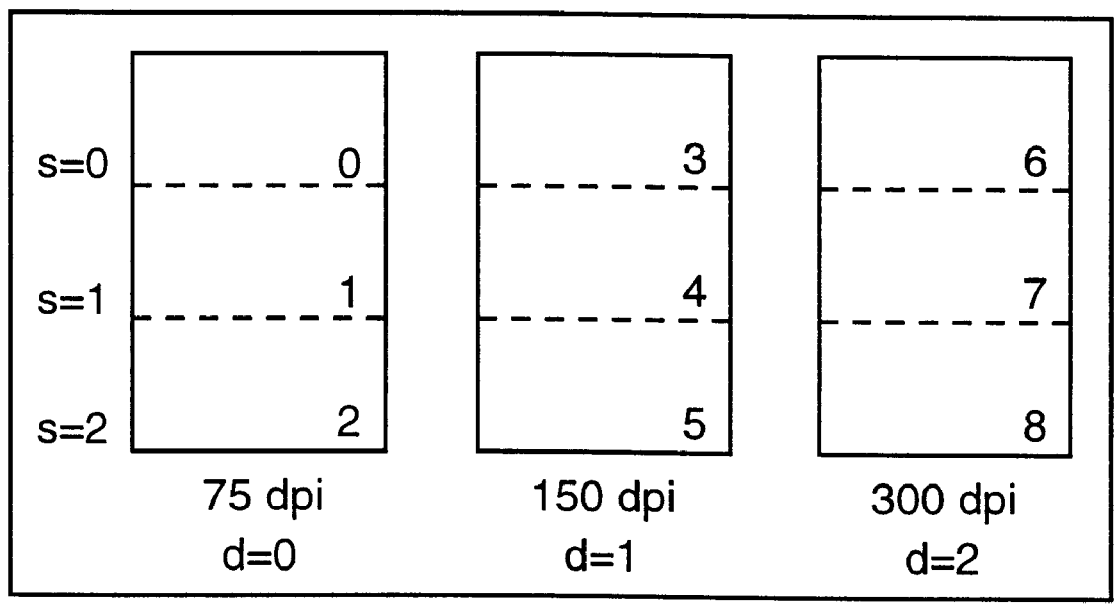
FIG. 15 is a stripe decomposition with 3 layers and 3 stripes.

FIG. 15 shows an image decomposed into three stripes, s, and three resolution layers, d. Each stripe s at each resolution d is coded into a subfile Cs,d. The JBIG file to describe the total image is a concatenation of header information and the Cs,d subfiles. Four ways of concatenating the stripe codings are defined in Table 1. Decoders work naturally from low resolution up, and so prefer the first two orderings of the table.

TABLE 1

POSSIBLE DATA ORDERINGS

| Hi to Low | Seq. | Order | | |
|---|---|---|---|---|
| 0 | 0 | 0, 1, 2 | 3, 4, 5 | 6, 7, 8 |
| 0 | 1 | 0, 3, 6 | 1, 4, 7 | 2, 5, 8 |
| 1 | 0 | 6, 7, 8 | 3, 4, 5 | 0, 1, 2 |
| 1 | 1 | 6, 3, 0 | 7, 4, 1 | 8, 5, 2 |

After dividing an image into bit planes, resolution layers and stripes, eventually a number of small bi-level bitmaps are left to compress. Compression is done using a Q-coder which codes bi-level pixels as symbols using the probability of occurrence of these symbols in a certain context. JBIG defines two kinds of context, one for the lowest resolution layer (the base layer), and one for all other layers (differential layers). Differential layer contexts contain pixels in the layer to be coded, and in the corresponding lower resolution layer.

The probability distribution of white and black pixels can be different for each combination of pixel values in a context. In an all white context, the probability of coding a white pixel will be much greater than that of coding a black pixel. The Q-coder assigns, just like a Huffman coder, more bits to less probable symbols, and so achieves compression. The Q-coder can, unlike a Huffman coder, assign one output code bit to more than one input symbol, and thus is able to compress bi-level pixels without explicit clustering, as would be necessary using a Huffman coder. Maximum compression is achieved when all probabilities (one set to each combination of pixel values in the context) follow the probabilities of the pixels. The Q-coder therefore continuously adapts these probabilities to the symbols it sees.

Since JBIG supports multiple bit planes, it is possible to effectively use the JBIG standard for the lossless coding of grayscale and color images as well. Images with eight or fewer bits/pixel compress well with the JBIG method, with more than eight bits/pixel other compression algorithms are more effective. In a study of international standards for lossless still image compression, JBIG compression was up to 29 percent superior to lossless JPEG compression for images with up to six bits/pixel. It was also found that JBIG had a 1.1 to 1.5 times better compression ratio on typical scanned documents, compared to G4 fax compression which had been the best compression algorithm for scanned documents available prior to JBIG.

Cost Analysis vs. Existing Document Coding Methods

Existing options for document conversion can be categorized into four classes: OCR, Image Database with Keywords, Image Database with OCR, and Structured Image Database with OCR. Each of these approaches to document conversion has its advantages and disadvantages. A summary of these is provided in Table 2.

The OCR approach is the most labor expensive. It requires complete conversion to electronic format. As indicated by our experiments, current OCR technology has only achieved a level to where it is cost competitive with manual reentry. This is very costly, but also produces the best final product. It uses the least amount of disk space, supports the best retrieval, and has optimal display quality. It just costs a lot to convert documents to this format.

The Image Database with Keywords approach is the next most labor expensive. This approach utilizes document images and document keywords. The keywords are manually obtained, and this requires extensive labor. Furthermore, the quality of the keywords is highly dependent on the expertise of the individual selecting the keywords. As such, the selection of keywords requires significant labor from a highly skilled individual. Both document images and ASCII keywords are stored under this approach, and thus, this method requires significantly more storage space than the OCR approach. Document retrieval is limited to the keywords associated with each document, and thus is only as comprehensive as the keywords. Display quality is limited to image quality. The conversion accuracy is optimal, since the content of the original document is preserved in the document image.

TABLE 2

DOCUMENT CONVERSION SUMMARY

| | Conversion Labor | Disk Space | Retrieval Accuracy | Display Quality | Conversion Accuracy |
|---|---|---|---|---|---|
| OCR | Very expensive | ASCII Text | Text Based | Optimal | Limited to OCT quality |
| Image Database with Keywords | Keyword entry can be costly Keywords | Document images and ASCII | Limited to keywords | Limited to image quality | Content preserved in image |
| Image Database with OCR | Lowest cost | Document images and ASCII text | Limited to dirty OCR | Limited to image quality | Content preserved in image |
| Structured Image DB with OCR | Document parsing cost | Document images and ASCII text | Dirty OCR and document structure | Limited to image quality | Content preserved in image |

The Image Database with OCR approach is the most labor inexpensive. This approach utilizes document images and uncorrected (or dirty) OCR. Since no corrections are made to the OCR, this approach minimizes conversion labor costs. Both document images and ASCII text are stored under this approach, and thus, this method requires more storage space than the Image Database with Keywords approach. The uncorrected OCR is used to retrieve images. This approach relies on the fact that the English language has many redundancies, and thus, a few OCR mistakes can be overlooked in the retrieval process. Display quality is limited to image quality. The conversion accuracy is optimal, since the content of the original document is preserved in the document image.

The Structured Image Database with OCR approach requires slightly more labor cost than the inexpensive Image Database with OCR approach. This approach utilizes document images, document structure knowledge, and uncorrected OCR. Both document images and ASCII text are stored under this approach, and thus, this method requires storage space that is similar to that of the Image Database with OCR approach. The uncorrected OCR is used to retrieve images, and again relies on English language redundancies for retrieval accuracy. Document structure can also be used in the retrieval process to focus query retrievals. Display quality is limited to image quality. The conversion accuracy is optimal, since the content of the original document is preserved in the document image.

Labor cost is the major price factor involved in each of these conversion approaches. For any large scale conversion task the labor costs associated with the OCR approach are simply prohibitive. Similarly, the labor cost associated with the Image Database with Keywords approach is also very expensive. Although not as extreme as the OCR labor costs, the selection of keywords involves manually categorizing the document contents. This requires a high degree of skill, and thus, is not inexpensive. The labor costs associated with the Image Database with OCR approach are minimal. Documents are simply scanned to create the document image database and OCRed to create the corresponding uncorrected ASCII text. Both can be highly automated. The labor costs associated with the Structured Image Database with OCR approach is slightly higher, since it involves manually monitoring and correcting the document parsing process. Simple tools can be developed to minimize the labor required for this process.

This invention employs the Structured Image Database with OCR approach. The prohibitive labor costs associated with the OCR and Image Database with Keyword approaches eliminated these approaches from further consideration. The costs associated with the Image Database with OCR and the Structured Image Database approaches were most comparable. The Structured Image Database with OCR approach was selected over the Image DB with OCR approach, however, because the structure knowledge was viewed as necessary to support simple network interfaces, valuable for retrieval performance, and relatively inexpensive.

The approach utilizes both document images and OCRed text. It is robust in that only document images are viewed (the quality of these images can be improved through the development of text specific image downsampling routines). Furthermore, the document is fully hypertext linked, and, as such, it is easy to navigate. Additionally, the search using the "dirty" OCRed text provides significant flexibility for finding information within the document (which can be further improved by registering the dirty ASCII text to image zones).

An efficient encoding method, including means for document searching, hyper-link indexing, and HTML coding has been described which provides a cost-effective means for many organizations to make data, which currently exists in only paper form, available to the rapidly growing number of computer and Internet users. Because the conversion method enables direct translation into HTML format, it can be used to create electronic documents that can be viewed by current Internet browsers like Mosaic or Netscape as well as disk and CDROM viewers (conventional word processor programs and edit/ viewer utilities).

That claimed is:

1. A method of automatically coding, managing, and displaying a document in digital form, the method comprising the steps of:

scanning a document into an image format suitable for display purposes;

embedding the image format into a hypertext-based meta-language format including one or more hypertext links;

segmenting the hypertext-based document into one or more structured blocks;

decoding a particular block into text, images, and tables, as appropriate, in accordance with a block-specific decoding strategy; and embedding the text derived from the block decoding into a conventional document format, enabling the use of a text-based search method.

2. The method of claim 1, wherein GIF is used as the image format.

3. The method of claim 1, wherein JBIG is used as the image format.

4. The method of claim 1, wherein HTML is used as the meta-language format.

5. The method of claim 1, wherein SGML is used as the meta-language format.

6. The method of claim 1, wherein the block-specific decoding strategy includes optical character recognition.

7. The method of claim 1, wherein the text-based search method is based on Boolean keyword expression matching.

8. The method of claim 1, including the step of visually indicating the hypertext links.

9. The method of claim 1, wherein the hypertext links are HTML-compatable URLs.

10. The method of claim 1, wherein the meta-language is primarily text-based, and wherein the images are in a native operating system format.

11. The method of claim 1, wherein the documents are stored on an Internet server enabling remote browser access.

12. The method of claim 1, wherein the documents are locally stored on a disk-based medium.

13. A method of digital document encoding and management, comprising the steps of:

scanning a document into one or more page images;

embedding at least one of the page images into a hypertext-based meta-language format which enables a user to automatically or manually segment the page images into document structure blocks;

decoding a particular block into text plus images and tables, as appropriate, in accordance with a block-specific decoding strategy, the text including one or more non-proofread (dirty) sections; and embedding the text, including the dirty sections, into a conventional document format, enabling the use of a text-based search method.

14. The method of claim 13, further including the step of transmitting the scanned image, including dirty text sections, for display purposes.

15. The method of claim 13, wherein the step of embedding at least one of the page images into a hypertext-based meta-language format further supports hypertext linkage through coding or attaching of hypertext links to subimage locations over word subimages within the full page image.

16. The method of claim 13, wherein the meta-language is a text-based format, and the images are in a native operating system format selected from among the following:

PICT (Macintosh),
BMP (Windows),
TIF (Generic),
MacDraw (Macintosh),
X11 (Unix),
CGM (Generic),
PostScript (Generic for printer output),
GIF (WWW/HTML), and
JPEG (WWW/HTML).

17. The method of claim 13, wherein the documents are stored on a World Wide Web server for remote HTML browser access.

18. The method of claim 13, wherein the documents are stored on removable, nonvolatile medium for local computer use.

* * * * *